US011896999B2

United States Patent

(12) United States Patent
Ruotsalainen et al.

(10) Patent No.: US 11,896,999 B2
(45) Date of Patent: Feb. 13, 2024

(54) CAST AND A SHAFT ASSEMBLY FOR A DISC SCREEN

(71) Applicant: Tana Oy, Jyväskylä (FI)

(72) Inventors: Jarkko Ruotsalainen, Vaajakoski (FI); Kari Rautakoski, Leppävesi (FI)

(73) Assignee: TANA OY, Jyväskylä (FI)

(*) Notice: Subject to any disclaimer, the term of this patent is extended or adjusted under 35 U.S.C. 154(b) by 123 days.

(21) Appl. No.: 17/616,936

(22) PCT Filed: Jun. 18, 2020

(86) PCT No.: PCT/FI2020/050440
§ 371 (c)(1),
(2) Date: Dec. 6, 2021

(87) PCT Pub. No.: WO2020/254730
PCT Pub. Date: Dec. 24, 2020

(65) Prior Publication Data

US 2022/0314279 A1 Oct. 6, 2022

(30) Foreign Application Priority Data

Jun. 20, 2019 (FI) ..................................... 20195544

(51) Int. Cl.
*B07B 1/15* (2006.01)

(52) U.S. Cl.
CPC ..................................... *B07B 1/15* (2013.01)

(58) Field of Classification Search
CPC ................................... B07B 1/14; B07B 1/15
See application file for complete search history.

(56) References Cited

U.S. PATENT DOCUMENTS 2,244,546 A 6/1941 Stockdale
3,519,129 A * 7/1970 Peterson ................ B07B 1/155 209/931
4,557,388 A * 12/1985 Peterson ................ B07B 13/04 209/931

(Continued)

FOREIGN PATENT DOCUMENTS

EP 1093861 A1 4/2001
EP 2181575 A1 5/2010

(Continued)

OTHER PUBLICATIONS

International Search Report and Written Opinion, Application No. PCT/FI2020/050440, dated Sep. 8, 2020.

(Continued)

*Primary Examiner* — Joseph C Rodriguez
(74) *Attorney, Agent, or Firm* — MacMillan, Sobanski & Todd, LLC

(57) ABSTRACT

The invention relates to a cast and adjacent casts on a shaft for providing a shaft assembly for a disc screen. A cast which is placeable on a shaft for a disc screen comprises a screening element part with an integral sleeve part. The shaft assembly for a disc screen comprises casts placed on the shaft, each cast comprising a screening element part and an integral sleeve part, the casts being placed against each other so that abutting screening element parts of two adjacent casts constitute a screening element, and abutting sleeve parts of two adjacent casts constitute a sleeve element on the shaft.

13 Claims, 4 Drawing Sheets

(56) References Cited

U.S. PATENT DOCUMENTS

| | | | | |
|---|---|---|---|---|
| 5,960,964 | A | 10/1999 | Austin et al. | |
| 8,627,962 | B2 * | 1/2014 | Cappozzo | B07B 1/50 209/672 |
| 9,387,516 | B1 * | 7/2016 | Davis | F16C 13/00 |
| 10,307,793 | B2 * | 6/2019 | Parr | D21D 5/046 |
| 10,888,899 | B2 * | 1/2021 | Tuttle | B07B 1/155 |
| 11,305,314 | B2 * | 4/2022 | Tazzoli | B07B 1/155 |
| 11,351,573 | B2 * | 6/2022 | Cappozzo | B07B 1/42 |
| 2010/0044283 | A1 | 2/2010 | Mitchell | |
| 2021/0205848 | A1 * | 7/2021 | Tuttle | B07B 1/155 |

FOREIGN PATENT DOCUMENTS

| | | | |
|---|---|---|---|
| FR | 2938157 | A1 | 5/2010 |
| GB | 1295782 | A | 11/1972 |

OTHER PUBLICATIONS

International Preliminary Report on Patentability, Application No. PCT/FI2020/050440, dated Oct. 14, 2021.

Opinion on Patentability, Application No. 20195544, dated Jan. 14, 2020.

Opinion on Patentability, Application No. 20195544, dated Sep. 3, 2021.

The extended European Search Report, Application No. 20826552.0, dated Jun. 16, 2023.

* cited by examiner

CAST AND A SHAFT ASSEMBLY FOR A DISC SCREEN

FIELD OF THE INVENTION

The invention relates to a cast and adjacent casts on a shaft for providing a shaft assembly for a disc screen.

BACKGROUND

A mechanical screen for separating materials, more precisely its disc screen, i.e. the screening surface, is provided with adjacent rotating shaft assemblies arranged one after another in the longitudinal direction of the machine. The disc screen comprises adjacent shaft assemblies provided with screening elements. The screening elements may have various shapes, such as discs or stars, or their shape may be irregular and/or comprise protruding parts. The screening elements of adjacent shaft assemblies are interlocked, whereby screening slots are left between them. Pieces having a particle size larger than the screening slots remain on the disc screen, and the rotating screening elements convey the pieces to, for example, a conveyor downstream of the disc screen. Pieces having a particle size smaller than the screening slots fall through the screening slots of the disc screen e.g. into a funnel or onto a conveyor under the disc screen.

The screening elements comprise an opening, typically in the center of the element, to enable their arrangement on a shaft so that the shaft extends through the opening. The profile of the shaft may be, for example, circular or angular. Sleeves may be provided between the screening elements on the shaft to keep the screening elements at a given space from each other on the shaft.

BRIEF SUMMARY

The aim is to implement a screening element and a sleeve suitable for a shaft assembly of a disc screen.

According to an aspect of the invention, a cast placeable on a shaft for a disc screen comprises a screening element part with an integral sleeve part.

According to an aspect of the invention, a shaft assembly for a disc screen comprises casts to be placed on a shaft, each cast comprising a screening element part with an integral sleeve part, and the casts being placed against each other so that the abutting screening element parts of two adjacent casts constitute a screening element, and the abutting sleeve parts of two adjacent casts constitute a sleeve on the shaft.

DESCRIPTION OF THE DRAWINGS

In the following, embodiments of the invention will be presented by means of appended drawings, in which.

The figures are not necessarily in scale.

DETAILED DESCRIPTION

Figure 1:
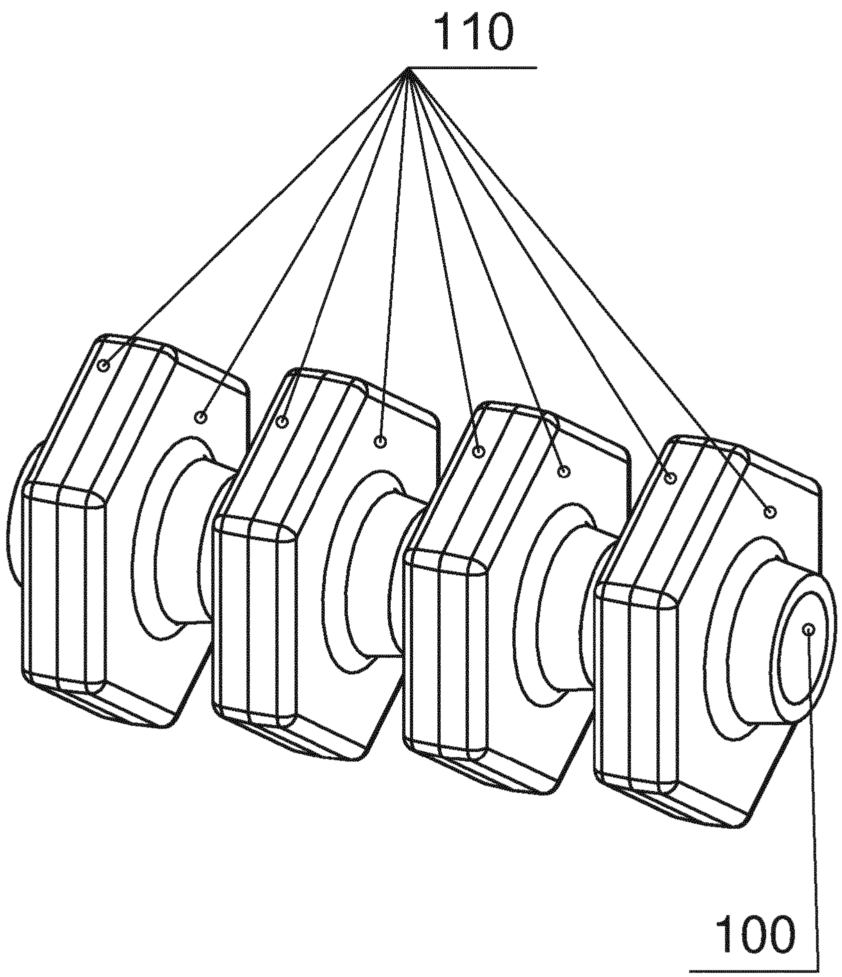
FIG. 1 shows a shaft provided with screening elements according to one embodiment of the invention.

FIG. 1 shows a shaft provided with screening elements according to one embodiment of the invention. In FIG. 1, screening elements 110 are provided on a shaft 100. The screening elements 110 of FIG. 1 are hexagonal discs. The screening elements may have different shapes, such as discs or stars, or the shape may be irregular and/or comprise protruding parts. Sleeves are provided between the screening elements 110. A sleeve is a hollow, i.e. tubular or annular, part placed around the shaft 100 and extending in parallel with the shaft 100. The sleeve defines the axial spacing between two screening elements. To increase the spacing between the screening elements, an auxiliary sleeve may be placed between the sleeve parts on the shaft 100. Both the screening elements 110 and the sleeves may comprise two abutting casts which may be cast components or pieces. This is illustrated in more detail in FIG. 2.

Figure 2:
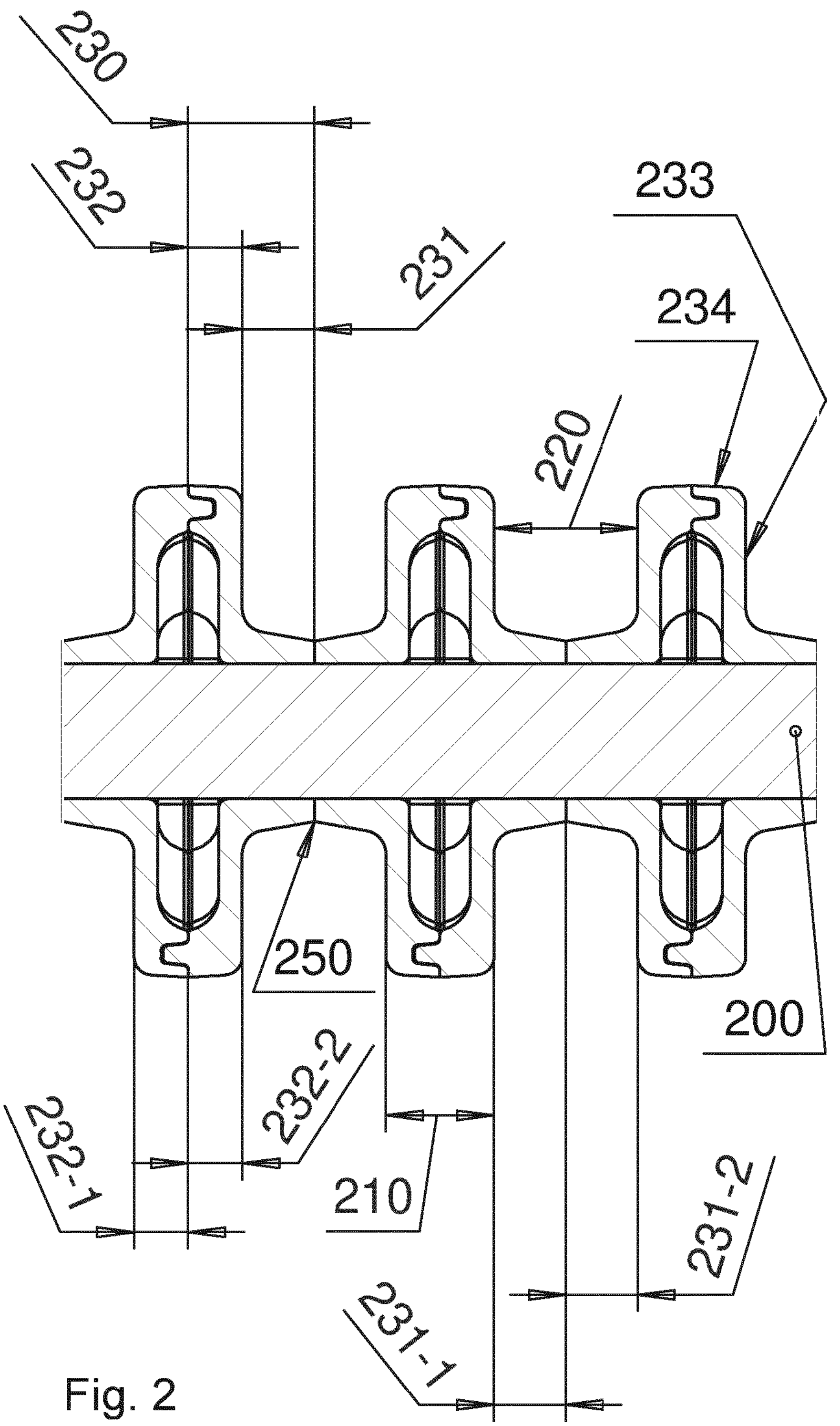
FIG. 2 shows a shaft provided with screening elements according to one embodiment of the invention.

FIG. 2 shows a shaft provided with screening elements according to one embodiment of the invention. The screening elements 210 and the sleeves 220 between them on the shaft 200 comprise casts 230. A cast 230 may be a single uniform cast piece. The cast 230 may comprise a screening element part 232 and a sleeve part 231. One end of the sleeve part 231 of the cast is joined to the screening element part 232 forming a single piece with the sleeve part 231, and the other end is an exposed, unattached outer edge.

A screening element 210 on the shaft 200 comprises abutting screening element parts 232-1, 232-2 of two casts 230. The screening element part 232-1 of one cast is placed against the screening element part 232-2 of an adjacent cast on the shaft 200. In this way, the abutting screening element parts 232-1, 232-2 of the two adjacent casts constitute the screening element 210.

A sleeve 220 between screening elements 210 on the shaft 200 comprises the abutting sleeve elements 231-1, 231-2 of two casts 230. The sleeve part 231-1 of one cast is placed against the sleeve part 231-2 of an adjacent cast on the shaft 200. The abutting sleeve parts 231-1, 231-2 constitute the sleeve 220 between the screening element parts.

The casts may comprise or consist of a metal, a polymer, a plastic, or a composite. The metal may be, for example, aluminium, a light metal alloy, cast iron, or cast steel. The plastic may be, for example, a wear and weather resistant plastic, such as polyethylene (PE), for example high density polyethylene (HDPE), ultra high molecular weight polyethylene (UHMWPE). The composite may contain a wear resistant material, metal, ceramic, plastic, or a combination of these, such as a two or more component plastic/metal, metal-ceramic, or ceramic-plastic. The cast may be coated in part or in whole.

The coating may comprise a composite or, for example, a substance comprising one or more metals, either in a mixture or in layers. The coating may protect from wear, smooth out the surface, and/or lubricate the surface. The casts can be made by forging, casting, or precision casting.

The cast and/or its manufacturing method make it possible to define the structure and the components in an appropriate way, for example according to the use. For example, the material strength of the cast and its components can be selected and adjusted to be appropriate. Thus, an appropriate material strength can be achieved in the different parts of the screening element to be formed of casts. Casts have no welded joints which could constitute a structurally weak point or a point of discontinuity during the use. The cast and/or its manufacturing method enable shaping, such as rounding, at specific selected points. By the shaping, advantages may be provided in the structure and in functionality during the use. The selection of materials suitable for manufacturing the cast is larger than that for a welded piece. In addition to metal, for example aluminium and plastic are suitable for casting.

The diameter of the outer surface of the sleeve part 231 may be substantially constant throughout the length of the sleeve part. The diameter of the outer surface of the sleeve part 231 may be narrower at the outer rim than at its end joining the screening element. The diameter of the outer surface of the sleeve part 231 may become steadily narrower towards its outer rim. The outer rim of the sleeve part 231 may constitute its narrowest part. The sleeve part 231-1 can be placed against the sleeve part 231-2 of the adjacent cast, or against an auxiliary sleeve to be placed between them, so that the outer rim of the sleeve part 231-1 abuts the outer rim of the adjacent sleeve part 231-2 or the auxiliary sleeve. The sleeve parts, or at least their outer rims, are substantially equal in size and shape, whereby they can be placed on the shaft so that their outer rims are abutting.

The screening element part 232 comprises a disc-like part 233 and an outer fringe 234. The disc-like part or disc part 233 extends from the sleeve part 231 in a substantially transverse direction. The disc part 233 is a disc part substantially transverse to the longitudinal mantle of the sleeve part, and thereby to the shaft 200. The disc part 233 may constitute a flange for the cylindrical sleeve part 231. The outer edge of the disc part 233 may constitute a straight or angular circumference, for example a circular, hexagonal or octagonal circumference. The outer fringe 234 of the screening element part extends from the outer edge of the disc part 233 in a substantially transverse direction, substantially in parallel with the sleeve part 231, and in a direction opposite to the sleeve part 231. A substantially transverse outer fringe 234 extends from the outer edge of the disc part, and a substantially transverse sleeve part 232 extends from the rim of the opening (shaft opening) in the disc part 233. The outer fringe 234 and the sleeve part 231 are substantially parallel and extend in opposite directions from the disc part 233.

The integrated single-piece cast with a screening element part and a sleeve part makes it possible to compose the shaft assembly and the disc screen by using parts of one type only. Furthermore, the cast can be manufactured in one type only. The casts may be mirror symmetric. The cast may be mirror symmetric with respect to its rotation axis or with respect to an abutting cast of identical type. The casts may be mirror symmetric in their appearance and/or irrespective of the counterparts provided in them for engaging the two casts with each other. The casts are placed against each other in such a way on the shaft that the mating outer edges of the casts, the outer rims of the sleeve parts, or the outer fringes of the screening element parts are placed against each other.

A space may be left between two outer fringes placed against each other. A screening element formed of two abutting screening element parts may be hollow. It is possible that the screening element parts are abutting on their whole edge part limited by the outer circumference, in which case the screening element is not hollow. The screening element may be hollow instead of consisting of solid material. A hollow structure reduces the demand for material. With a hollow screening element, it is possible to achieve appropriate strength, hardness and/or wear strength suitable for the use.

The joint between the screening element part 232 and the sleeve part 231 may be rounded. A large rounding may be provided at the joint of the screening element part 232 and the sleeve part 231, i.e. at the foot of the sleeve part which is against the disc part 233 of the screening element part. The rounding makes the angle between the disc part 233 and the sleeve part 231 shallower. The rounding increases the diameter of the outer surface of the sleeve part 231. The diameter of the outer surface of the sleeve part 231 may be the largest at its foot which is against the disc part 233. The diameter of the outer surface of the sleeve part 231 may be larger at its foot or increase towards the foot, for example to 1.1 to 3.5 fold, such as 1.5 fold, compared with the diameter of the outermost outer surface of the sleeve part 231. The outermost surface of the sleeve part 231 can be placed against the corresponding surface of the sleeve part of the adjacent screening element. The rounding may be gradual so that the diameter of the outer surface of the sleeve part 231 decreases steadily towards its outer edge. The sleeve part 231 may be conical, and its foot may be expanding so that it expands towards the wall of the disc part 233. An inclined junction surface may be provided between the wall of the substantially straight disc part 233 and the mantle of the substantially straight sleeve part 231. When the casts have been placed on the shaft, with the joint surfaces 200 abutting each other, the material flow will be guided from the foot part of the sleeve towards the joint 250 of the sleeve parts, their seam, where the diameter of the sleeve 220 is the smallest. In this way, no material will remain or accumulate in the joint or seam between the sleeve part 231 and the screening element part 232. This will reduce or prevent twisting of material to be processed, and clogging of the screen. In solutions of prior art, in which separate sleeves are provided between separate screening elements, there may be a sharp angle or gap at the joint between the sleeve and the screening element. The joint between the sleeve and the screening element is susceptible to accumulation and sticking of material. This may cause twisting of the material and problems of clogging of the screen. Attempts to solve this problem have included auxiliary sleeves or nested sleeves, whereby the outermost sleeve rotates freely, irrespective of the screening element, so that the material to be screened is prevented from twisting around the shaft, or its twisting is reduced. However, this requires the provision and use of auxiliary parts. A sleeve according to the solution of prior art may comprise an inner sleeve which determines the spacing between the screening elements, a middle sleeve which constitutes a bearing and thereby a wearing part, and an outermost sleeve whose rotation is not dependent on the rotation of the inner sleeves or the shaft.

The casts may be mirror symmetric and identical to each other. As a result, the shaft assemblies of the disc screen can be composed of casts of a single type. It will not be necessary to manufacture different pieces, such as different screening elements or sleeves, or to fit them to each other. The casts are arranged pairwise to abut each other so that the screening element parts of adjacent casts are against each other. These cast pieces placed pairwise are assembled next to each other on a shaft. In this way, the sleeve parts of adjacent cast pairs are placed against each other. Thus, the shaft assembly comprises parts which correspond to those of a conventional implementation where the screening elements and the sleeves are separate parts. The sleeve parts of adjacent casts may abut each other on the shaft. The screening element parts of adjacent casts may constitute counterparts to be mated. The counterparts are mated so that their mutual spacing is small or minimized.

Figure 3:
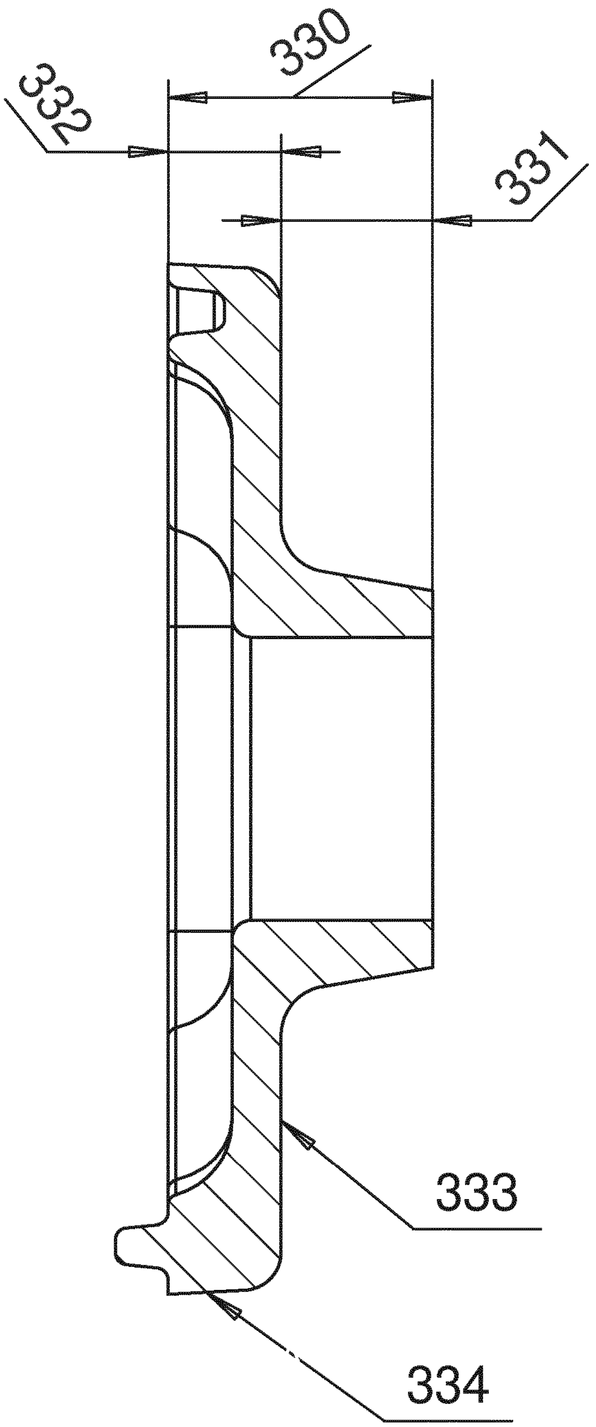
FIG. 3 shows a cast according to one embodiment of the invention.

FIG. 3 shows a cast according to one embodiment of the invention. The cast 330 is a cast single piece with a screening element part 332 and a sleeve part 331. The joint between the screening element part 332 and the sleeve part 331 is rounded so that there is no angle but the joint is a curved uniform surface. The screening element part 332 comprises a disc part 333 and an outer fringe 334. The disc part 333 is between the sleeve part 331 and the outer fringe 334. The outer fringe 334 can be placed against the outer fringe of another cast, a pair of casts. The casts can be placed against each other. Opposite casts may comprise mating parts or counterparts placed and to be placed against each other. Casts connected by the counterparts do not move with respect to each other, at least not as easily or as much as abutting casts without counterparts. The counterparts may facilitate the power transmission on the circumference, for example by keeping the casts together with respect to the rotation, also on the circumference. By means of the counterparts, the casts can be placed and remain more tightly and less movably against each other. In this way it is possible to reduce wearing of the shafts and rattling of the casts or their deviation from their intended paths.

The outer fringes 334 of two casts, to be placed against each other, can constitute counterparts. The shape of the outer fringe 334, or its side to be placed against the adjacent outer fringe, may be such that it takes its place, in the correct position, against the outer rim of the pair of casts. The mating counterparts may be placed on the outer fringe 334, in the disc part 333, on their side or at their edge to be placed against the corresponding pair of casts. Alternatively or in addition, the counterparts may be provided in the sleeve parts of the casts, for example at the outermost rim of the sleeve part. By means of the counterparts, the pair of casts can be placed in the correct position against each other. Furthermore, by means of the counterparts, the casts of the pair do not substantially move against each other when they are placed in the correct position against each other. In this way, the casts can be arranged to rotate simultaneously and in a uniform manner around the shaft.

The counterparts or mating parts can be formed by means of an interlocking or tongue-and-groove design, for example. A tongue-and-groove pair is shown in FIG. 3, on the side of the outer fringe 334, which can be placed against the counterpart of the adjacent cast to form a screening element on the shaft. The counterpart may also be a pin or a protrusion, possibly shaped, and an opening or rim in the counterpart, possibly shaped in a corresponding way. The counterparts may be formed by grooves and elongated protrusions. Disc-like protrusions or V-shaped protrusions may also be placed against each other to form the counterparts.

The screening element may have a symmetrical, for example hexagonal shape. The counterparts at the outer fringe of a symmetrical screening element part may comprise two types of counterparts which alternate, for example on the sides of a hexagon. In this way, the screening elements are symmetrical and can be placed against each other by means of the counterparts. Different counterparts are placed against each other. Their outer fringes abutting each other, the screening element parts constitute a hollow screening element. An empty space is left between the disc parts in the pair of casts. It is possible to implement the casts so that no empty space is left between the disc parts but it is filled with cast material as well.

The counterparts may be placed, for example, in the disc part. The wall of the disc part facing another disc part may comprise, for example, protruding pins and/or hollow pins which can be placed against each other. Other shapes interlocking with or engaging each other are also possible. The placement of the counterparts in the disc part provides freedom for the shape of the screening element part, for example. Its appearance does not have to be fully symmetrical, but the screening element part may constitute an asymmetrical screening element comprising various protrusions, grooves or branches.

Figure 4:
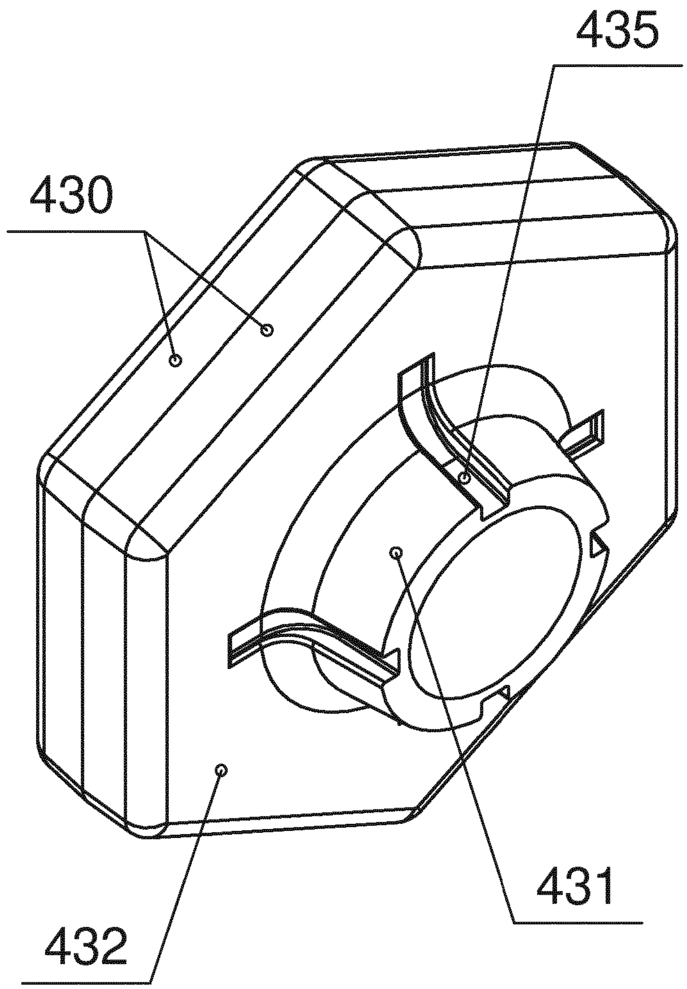
FIG. 4 shows a screening element according to one embodiment of the invention.

FIG. 4 shows a screening element according to one embodiment of the invention. The screening element comprises cast pieces 430 arranged pairwise. The cast piece 430 comprises a screening element part 432 and a sleeve part 431. The outer surface of the sleeve part 431 may be provided with a groove 435 extending in its longitudinal direction. The groove 435 may extend as a uniform groove onto the outer surface of the disc part of the screening element part 432. The groove 435 can be made during casting. The groove 435 can be worked afterwards. The groove 435 may function as a so-called break line. If material to be processed is twisted around the sleeve, the material can be cut by pressing with a blade at the break line. This facilitates and speeds up the cleaning and maintenance of the disc screen. The cast may comprise one or more grooves. For example, two grooves may be provided symmetrically with respect to the axis of rotation of the sleeve part.

The cast can make it possible to use efficient manufacturing methods and to reduce the number of parts. Reducing the number of parts may simplify and/or accelerate the manufacture of the parts, the selection of the manufacturing method, the installation, and the assembly of the parts. The casts can make it possible to use a single manufacturing method and/or the manufacture of parts in one type only. By means of the cast and its manufacturing method, it is possible to utilize different materials. With the uniform cast, it is possible to prevent or reduce weaknesses causes by seams and joints. The cast and the shaft assembly can provide cost efficiency.

The invention has been described above by means of drawings, possible examples and embodiments. These are not intended to be limiting, but the described parts or their order can be interchanged, replaced with corresponding ones, or left out insofar as applicable according to the aspects of the invention.

The invention claimed is:

1. A cast which is placeable on a shaft for a disc screen, the cast comprising a screening element part and an integral sleeve part, wherein the screening element part constitutes a disc-like part around the shaft, and abutting screening element parts of two adjacent casts constitute a screening element, and which sleeve part is configured to define axial spacing between two adjacent screening elements, wherein only outer fringes of said screening element parts of two adjacent casts are abutted each other so that the constituted screening element is hollow and an empty space is left between the two adjacent casts when placed around the shaft.

2. The cast according to claim 1, wherein the cast is at least substantially mirror symmetric with respect to its axis of rotation and/or with respect to a surface of the cast facing another cast to be placed on the shaft.

3. The cast according to claim 1, wherein the outer surface of the sleeve part is cylindrical or conical, wherein optionally the diameter of the outer surface of the sleeve part increases 1.1 to 3.5 fold from the outer edge of the sleeve part to a foot of the sleeve, the foot being against the screening element part.

4. The cast according to claim 1, wherein the screening element part encircles the shaft as a disc-like part whose outer rim is optionally a straight circle, an angular circle, a circumference, a hexagon, an octagon; or comprises regular or irregular protrusions or branches.

5. The cast according to claim 1, comprising one or more of the following: metal, plastic and composite; or is made of a metal, a plastic, a composite, or a mixture or a combination of these.

6. The cast according to claim 1, wherein the screening element part is placeable against the screening element part of an adjacent cast on the shaft; and/or wherein the sleeve part is placeable against the sleeve part of an adjacent cast on the shaft.

7. A cast which is placeable on a shaft for a disc screen, the cast comprising a screening element part and an integral sleeve part, wherein the screening element part constitutes a disc-like part around the shaft, and abutting screening element parts of two adjacent casts constitute a screening element, and which sleeve part is configured to define axial spacing between two adjacent screening elements, wherein only outer fringes of said screening element parts of two adjacent casts are abutted each other so that the constituted screening element is hollow, and wherein the screening element part comprises a disc-like part which extends in a substantially transverse direction from the sleeve part, as well as an outer fringe which extends in a substantially transverse direction from the disc-like part, substantially in parallel with the sleeve part, in a direction opposite to the sleeve part.

8. The cast according to the preceding claim 7 wherein the outer fringe is placeable against the outer fringe of an adjacent cast.

9. The cast according to claim 1, which is placeable against an adjacent cast on the shaft by means of counterparts.

10. The cast according to claim 1, comprising at least one counterpart for engaging with another cast, the counterpart being alternatively provided in the screening element part, at the outer fringe of the screening element part, in the disc part of the screening element part, at the edge of the disc part, and/or in the sleeve part.

11. A cast which is placeable on a shaft for a disc screen, the cast comprising a screening element part and an integral sleeve part, wherein the screening element part constitutes a disc-like part around the shaft, and abutting screening element parts of two adjacent casts constitute a screening element, and which sleeve part is configured to define axial spacing between two adjacent screening elements, wherein only outer fringes of said screening element parts of two adjacent casts are abutted each other so that the constituted screening element is hollow, and wherein the outer surface of the sleeve part is provided with a groove extending in the longitudinal direction of the sleeve part, optionally extending to the disc part of the screening element part.

12. A shaft assembly for a disc screen, comprising casts to be placed on a shaft, wherein each cast comprises a screening element part and a sleeve part which are integrated and are placed against each other so that abutting screening element parts of two adjacent casts constitute a screening element, and abutting sleeve parts of two adjacent casts constitute a sleeve element on the shaft, and which sleeve parts are configured to define an axial spacing between the screening element parts of the two adjacent screening elements, wherein only outer fringes of said screening element parts of two adjacent casts are abutted each other so that the constituted screening element is hollow and an empty space is left between the two adjacent casts when placed around the shaft.

13. The shaft assembly according to claim 12, comprising casts, wherein the cast is at least substantially mirror symmetric with respect to an axis of rotation and/or with respect to a surface facing another cast to be placed on the shaft.

* * * * *